(12) United States Patent
Huang et al.

(10) Patent No.: US 11,493,039 B2
(45) Date of Patent: Nov. 8, 2022

(54) CRANKSHAFT ASSEMBLY, COMPRESSOR AND REFRIGERATION DEVICE

(71) Applicant: ANHUI MEIZHI COMPRESSOR CO., LTD., Anhui (CN)

(72) Inventors: Gang Huang, Anhui (CN); Xuebao Shen, Anhui (CN)

(73) Assignee: ANHUI MEIZHI COMPRESSOR CO., LTD., Hefei (CN)

( * ) Notice: Subject to any disclaimer, the term of this patent is extended or adjusted under 35 U.S.C. 154(b) by 57 days.

(21) Appl. No.: 17/135,296

(22) Filed: Dec. 28, 2020

(65) Prior Publication Data

US 2021/0115922 A1    Apr. 22, 2021

Related U.S. Application Data

(63) Continuation of application No. PCT/CN2019/105965, filed on Sep. 16, 2019.

(30) Foreign Application Priority Data

Sep. 26, 2018  (CN) .......................... 201811125328.0

(51) Int. Cl.
*F01C 1/24* (2006.01)
*F03C 2/00* (2006.01)
(Continued)

(52) U.S. Cl.
CPC ............ *F04C 15/0065* (2013.01); *F04C 2/16* (2013.01); *F04C 15/0088* (2013.01);
(Continued)

(58) Field of Classification Search
CPC .. F04C 2/126; F04C 2/16; F04C 14/04; F04C 15/0065; F04C 15/0088; F04C 2210/206;
(Continued)

(56) References Cited

U.S. PATENT DOCUMENTS 3,848,702 A * 11/1974 Bergman ............... F04C 29/023
418/94
4,568,253 A *  2/1986 Wood .................... F04C 29/023
418/94
(Continued)

FOREIGN PATENT DOCUMENTS

CN         1215805 A    5/1999
CN         1427154 A    7/2003
(Continued)

OTHER PUBLICATIONS

KR100745712B1—Tak Gyeong Sik—Oil Pump Apparatus for Hermetic Compressor—Aug. 2, 2007—English Translation (Year: 2007).*
(Continued)

*Primary Examiner* — Theresa Trieu
(74) *Attorney, Agent, or Firm* — Scully Scott Murphy & Presser

(57) ABSTRACT

A crankshaft assembly, a compressor and a refrigeration device are provided. The crankshaft assembly has an eccentric shaft component, a spindle component and a main screw oil pump. The eccentric shaft component has an eccentric cavity, and the spindle component has a first cavity communicated with the eccentric cavity. A first through-hole and a second through-hole in a first spindle are each communicated with the first cavity. An outer surface of the first spindle is provided with a first spiral oil groove connecting the first through-hole and the second through-hole. An outer surface of the main screw oil pump is provided with a second spiral oil groove along its length direction, and a spiral direction of the second spiral oil groove is opposite that of the first spiral oil groove.

13 Claims, 7 Drawing Sheets

(51) Int. Cl.
*F03C 4/00* (2006.01)
*F04C 15/00* (2006.01)
*F04C 2/00* (2006.01)
*F04C 2/16* (2006.01)

(52) U.S. Cl.
CPC .... *F04C 2210/206* (2013.01); *F04C 2240/30* (2013.01); *F04C 2240/60* (2013.01)

(58) Field of Classification Search
CPC .............. F04C 2240/30; F04C 2240/60; F04C 2240/603; F04C 2240/801; F04C 2240/809; F04B 39/0094; F04B 39/02; F04B 39/0238–0253; F04B 39/0261; F04B 39/0269; F04B 39/0284; F04B 39/0292; F04B 53/18; F04B 41/06; F16C 3/10; F16C 3/14; F25B 31/002; F25B 31/004; F16N 7/366; F16N 13/20; F16N 2013/205
See application file for complete search history.

(56) References Cited

U.S. PATENT DOCUMENTS

| | | | | |
|---|---|---|---|---|
| 8,202,067 | B2* | 6/2012 | Klein | F04B 39/0246 417/366 |
| 2004/0241013 | A1* | 12/2004 | Park | F04C 29/02 184/6.16 |
| 2006/0275157 | A1* | 12/2006 | Hayashi | F04B 39/0253 417/368 |
| 2011/0265510 | A1* | 11/2011 | Kim | F04B 39/0246 417/437 |
| 2014/0314589 | A1* | 10/2014 | Kim | F04B 39/0246 417/368 |
| 2015/0147203 | A1* | 5/2015 | Kim | F04B 39/0253 417/372 |
| 2017/0306941 | A1* | 10/2017 | Kawano | F04B 39/02 |

FOREIGN PATENT DOCUMENTS

| | | | | |
|---|---|---|---|---|
| CN | 1513087 | A | 7/2004 | |
| CN | 201165958 | Y | 12/2008 | |
| CN | 201474913 | U | 5/2010 | |
| CN | 104302915 | A | 1/2015 | |
| CN | 105041610 | A | 11/2015 | |
| CN | 106678019 | A | 5/2017 | |
| DE | 4239691 | A1 | 6/1994 | |
| JP | 2005337158 | A | * 12/2005 | .............. F04B 39/02 |
| JP | 2005337158 | A | 12/2005 | |
| JP | 2014156803 | A | 8/2014 | |
| KR | 20090008042 | A | 1/2009 | |

OTHER PUBLICATIONS

KR100745713B1—Tak Gyeong Sik—Oil Pump Apparatus for Hermetic Compressor—Nov. 29, 2002—English Translation (Year: 2002).*

Office Action dated Aug. 5, 2020 received in Chinese Patent Application No. 201811125328.0, 14 pages.

International Search Report dated Dec. 19, 2019, issued in PCT/CN2019/105965, 19 pages.

* cited by examiner

US 11,493,039 B2

CRANKSHAFT ASSEMBLY, COMPRESSOR AND REFRIGERATION DEVICE

CROSS-REFERENCE TO RELATED APPLICATIONS

The present application is a continuation application of PCT International Application No. PCT/CN2019/105965, filed on Sep. 16, 2019, which claims priority to Chinese Patent Application Serial No. 201811125328.0 filed with China National Intellectual Property Administration on Sep. 26, 2018, the entire contents of which are incorporated herein by reference for all purposes. No new matter has been introduced.

FIELD

The present disclosure relates to the field of compressors, and more particularly to a crankshaft assembly, a compressor and a refrigeration device.

BACKGROUND

The fully enclosed reciprocating refrigeration compressor is the core component of the small refrigeration device such as the refrigerator, freezer and the like. The crankshaft, as the main rotation component of the reciprocating variable capacity refrigeration compressor, carries the mission of safe operation of the whole compressor. The crankshaft assemblies in the related art are mainly designed for the forward rotation of the compressors. The mounting and fixing of the eccentric shaft sleeve is not considered during connection designs of the crankshaft oil pumping system, the crankshaft and the link, which leads to an insufficient amount of pumped oil when reverse rotation of the compressor in the process of implementing reciprocating variable capacity refrigeration, severe wear of the crankshaft, sever wear of the mounting face of the eccentric shaft sleeve, increased energy consumption of the compressor, or other problems.

SUMMARY

An objective of the present disclosure is to overcome the problems existing in the related art, and provide a crankshaft assembly, a compressor and a refrigeration device. The crankshaft assembly can ensure a sufficient amount of pumped oil in both forward and reverse rotation and is easy to process.

To realize the above objection, an aspect of the present disclosure provides a crankshaft assembly including: an eccentric shaft component having an eccentric cavity, an oil outlet hole being defined through a wall defining the eccentric cavity; a spindle component provided at an axial end of the eccentric shaft component and including a first spindle having a first cavity communicated with the eccentric cavity, the first spindle being provided with a first through-hole and a second through-hole spaced apart along its length direction, the first through-hole and the second through-hole being each communicated with the first cavity, an outer surface of the first spindle being provided with a first spiral oil groove connecting the first through-hole and the second through-hole; and a main screw oil pump including a second spindle provided in the first cavity, an outer surface of the second spindle being provided with a second spiral oil groove along its length direction, a spiral direction of the second spiral oil groove being opposite a spiral direction of the first spiral oil groove, a first end of the second spiral oil groove being communicated with the first cavity and a second end of the second spiral oil groove being communicated with the eccentric cavity. The oil entering the first cavity flows to the oil outlet hole through the first spiral oil groove when the crankshaft assembly is rotated along a first direction; the oil entering the first cavity flows to the oil outlet hole through the second spiral oil groove when the crankshaft assembly is rotated along a second direction opposite to the first direction.

According to some embodiments of the present disclosure, an end of the second spindle is provided with a countersink, a notch of the countersink is communicated with the eccentric cavity, the second spindle is provided with a third through-hole communicated with the countersink, and the second end of the second spiral oil groove is communicated with the third through-hole.

According to some embodiments of the present disclosure, the second spindle and the first cavity are in clearance fit, an oil slinger is provided between the third through-hole and the notch of the countersink, the oil slinger abuts against the outer surface of the second spindle and an inner wall of the first cavity, a separating cavity is defined between the oil slinger, the outer surface of the second spindle and the inner wall of the first cavity, the separating cavity is communicated with the eccentric cavity, and the second through-hole is provided adjacent to the eccentric shaft component and is communicated with the separating cavity.

According to some embodiments of the present disclosure, an end of the first spindle adjacent to the eccentric shaft component is secured with a first crank arm defining a spindle hole, the first spindle is mounted in the spindle hole, the crankshaft assembly also includes: an oil guide plate secured between the eccentric shaft component and the first crank arm, the oil guide plate is provided with an oil guide hole, the first cavity is communicated with the eccentric cavity through the oil guide hole.

According to some embodiments of the present disclosure, an axial end of the second spindle extends into the oil guide hole and has a position-limiting part abutted against an end face of the first spindle or an end face of the first crank arm.

According to some embodiments of the present disclosure, the position-limiting part is formed as a positioning boss, and the positioning boss is abutted against the end face of the first spindle.

According to some embodiments of the present disclosure, the eccentric shaft component includes an eccentric shaft defining the eccentric cavity and a second crank arm defining an eccentric shaft hole, the eccentric shaft is mounted in the eccentric shaft hole; the oil guide hole includes a first hole and a second hole communicated with each other, the first hole and the second hole are disposed along a radial direction of the oil guide plate, the first hole and the spindle hole are coaxially disposed, and the second hole and the eccentric shaft hole are coaxially disposed.

According to some embodiments of the present disclosure, the crankshaft assembly includes an oil pump component, the oil pump component is provided at an end of the first spindle away from the eccentric shaft component to supply oil to the first cavity, the oil pump component includes an oil pump housing and an oil vane disposed inside the oil pump housing, a first end of the oil pump housing is provided with an oil inlet and a second end of the oil pump housing is connected with the first spindle.

According to some embodiments of the present disclosure, the oil vane and the oil pump housing are disposed with interference fit, and/or the oil pump housing and the first spindle are connected with interference fit.

A second aspect of the present disclosure provides a compressor including the above crankshaft assembly.

The present disclosure further provides a refrigeration device including the above compressor.

According to the above technical scheme, the oil outlet hole of the eccentric shaft is communicated with the cavity of the spindle through the oil guide hole of the oil guide plate, while the main screw oil pump and the first spindle are coaxially provided in the first cavity, such that when the crankshaft assembly is rotated along the first direction, the lubricating oil entering the first cavity will sequentially pass through the first through-hole, the first spiral oil groove, the second through-hole and the oil guide hole, and finally be discharged from the oil outlet hole; when the crankshaft assembly is rotated along the second direction opposite the first direction, the oil entering the first cavity sequentially passes through the second spiral oil groove and the oil guide hole, and finally is discharged from the oil outlet hole.

BRIEF DESCRIPTION OF DRAWINGS

The above and/or additional aspects and advantages of the present disclosure will become apparent and more readily appreciated from the following description of embodiments with reference to the drawings, in which.

DETAILED DESCRIPTION OF EMBODIMENTS

The embodiments of the present disclosure will be described in detail with reference to the accompanying drawing. It should be understood that the embodiments here is only used to explain and interpret the present disclosure, but is not used to limit the present disclosure.

Figure 1:
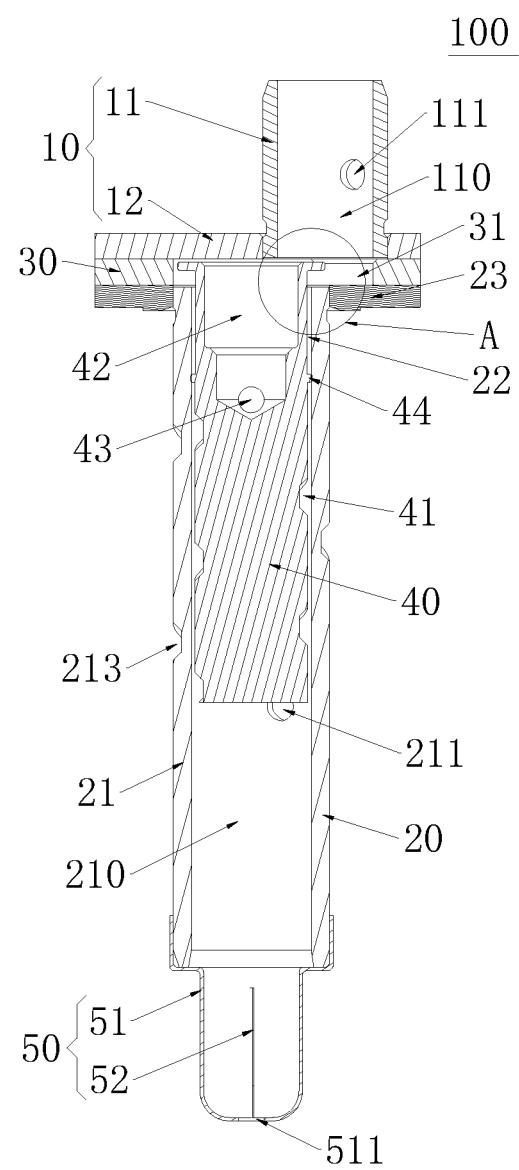
FIG. 1 is a sectional view of a crankshaft assembly according to some embodiments of the present disclosure.
Figure 2:
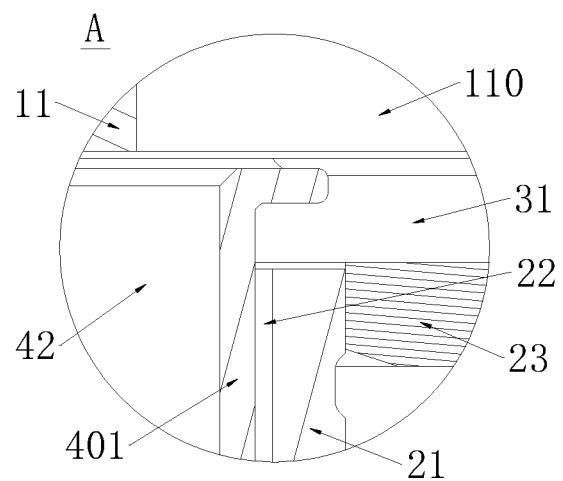
FIG. 2 is an enlarged view of the portion A in FIG. 1.
Figure 3:
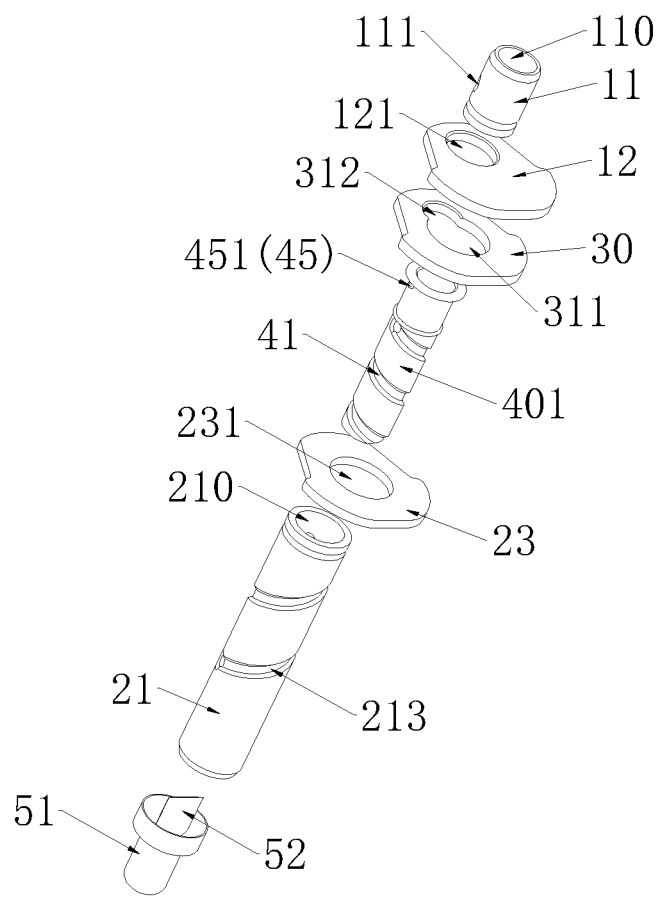
FIG. 3 is an exploded view of a crankshaft assembly according to some embodiments of the present disclosure.

As illustrated in FIGS. 1 to 3, a crankshaft assembly 100 of the present disclosure includes an eccentric shaft component 10, a spindle component 20 and a main screw oil pump 40. The eccentric shaft component 10 has an eccentric cavity 110 which is defined by a wall of the eccentric shaft component 10. An oil outlet hole 111 is defined through the wall defining the eccentric cavity 110. The oil outlet hole 111 is communicated with the eccentric cavity 110. The spindle component 20 is provided at an axial end of the eccentric shaft component 10 (for example, a lower end in FIG. 1), and includes a first spindle 21 having a first cavity 210. The first cavity 210 is communicated with the eccentric cavity 110. The first spindle 21 is provided with a first through-hole 211 and a second through-hole 212 spaced apart along the length direction or the axial direction of the first spindle 21. The first through-hole 211 and the second through-hole 212 are each communicated with the first cavity 210. The outer surface of the first spindle 21 is provided with a first spiral oil groove 213 connecting the first through-hole 211 and the second through-hole 212, that is, two ends of the first spiral oil groove 213 are communicated with the first through-hole 211 and the second through-hole 212 respectively. The main screw oil pump 40 includes a second spindle 401. The second spindle 401 is provided in the first cavity 210. An outer surface of the second spindle 401 is provided with a second spiral oil groove 41 along the length direction of the second spindle 401, and a spiral direction of the second spiral oil groove 41 is opposite the spiral direction of the first spiral oil groove 213. A first end of the second spiral oil groove 41 (for example, a lower end in FIG. 1) is communicated with the first cavity 210, and a second end of the second spiral oil groove 41 (for example, an upper end in FIG. 1) is communicated with the eccentric cavity 110.

When the crankshaft assembly 100 is rotated along a first direction, oil entering the first cavity 210 flows to the oil outlet hole 111 through the first spiral oil groove 213; when the crankshaft assembly 100 is rotated along a second direction opposite the first direction, oil entering the first cavity 210 flows to the oil outlet hole 111 through the second spiral oil groove 41. It should be understood that the spiral directions of the first spiral oil groove 213 and the second spiral oil groove 41 are opposite, so lubricating oil can move toward the oil outlet hole 111 of the eccentric shaft 11 through one of the spiral oil grooves whether the crankshaft assembly 100 is rotating in the first direction or the second direction (i.e., a compressor is turning forward or reverse), which ensures that the lubricating oil can sufficiently lubricate individual components of the entire crank and link assembly (the crankshaft assembly 100 is also a component of the crank and link assembly) when the crankshaft assembly 100 is rotating.

In some embodiments of the present disclosure, the second spiral oil groove 41 of the outer surface of the second spindle 401 can extend to two ends of the main screw oil pump 40, such that the lubricating oil can flow from an end of the main screw oil pump 40 to the other end of the main screw oil pump 40 along the second spiral oil groove 41. In such an arrangement, the second through-hole 212 of the first spindle 21 can be provided at the edge of the end of the first spindle 21, which enables the lubricating oil to flow from the first through-hole 211 to the first spiral oil groove 213 and flow along the first spiral oil groove 213 to the second through-hole 212. Moreover, both the second through-hole 212 of the first spindle 21 and an end of the second spiral oil groove 41 of the main screw oil pump 40 are communicated with the eccentric cavity 110, such that the lubricating oil can flow directly into the eccentric cavity 110. However, in some embodiments of the present disclosure, the structural design of the first spindle 21 and the main screw oil pump 40 employs a form different from the above-described, and some embodiments of the present disclosure will be explained in detail.

Figure 9:
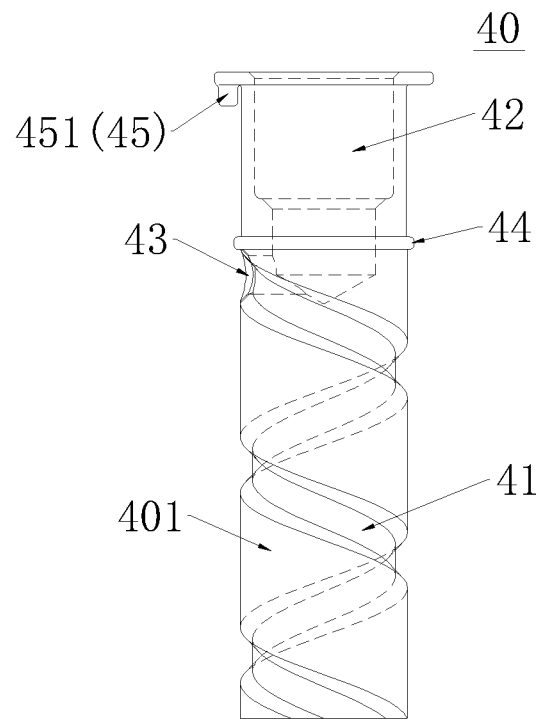
FIG. 9 is a schematic view of a main screw oil pump of a crankshaft assembly according to the present disclosure.

As illustrated in FIG. 9, an end of the second spindle 401 is provided with a countersink 42, a notch of the countersink 42 is communicated with the eccentric cavity 110, and the second spindle 401 is provided with a third through-hole 43 communicated with the countersink 42. The second end of the second spiral oil groove 41 (for example, the upper end in FIG. 9) is connected with the third through-hole 43 to communicate the second spiral oil groove 41 with the eccentric cavity 110 through the third through-hole 43 and the countersink 42. By the above-described arrangement, the notch of the countersink 42 is directly or indirectly in communication with the eccentric cavity 110, the other end of the countersink 42 is communicated with the second spiral oil groove 41 through the third through-hole 43, such that the lubricating oil can flow along the second spiral oil groove 41 through the third through-hole 43 and into the countersink 42, and then flow from the notch of the countersink 42 into the eccentric cavity 110. The advantage of such arrangement is that the second spiral oil groove 41 does not need to extend from an end of the second spindle 401 to the other end of the second spindle 401, thereby reducing difficulty and labor intensity for processing of the spiral oil groove.

Furthermore, the second through-hole 212 of the first spindle 21 is not in direct communication with the eccentric cavity 110, reducing the probability of oil reflux. However, in this case the second through-hole 212 needs to be communicated with the eccentric cavity 110 by other structures. Therefore, as illustrated in FIG. 9, the second spindle 401 and the first spindle 21 are in clearance fit with each other (i.e. the second spindle 401 and the first cavity 210 are in clearance fit); an oil slinger 44 is provided between the third through-hole 43 and the notch of the countersink 42, the oil slinger 44 abuts against the outer surface of the second spindle 401 and the inner wall of the first cavity 210; a separating cavity 22 is defined between the oil slinger 44, the outer surface of the second spindle 401 and the inner wall of the first cavity 210, the separating cavity 22 is communicated with the eccentric cavity 110, the second through-hole 212 of the first spindle 21 is provided adjacent to the eccentric shaft component 10 and is communicated with the separating cavity 22. That is, when the crankshaft assembly 100 is rotated along the first direction, the lubricating oil will flow from the first cavity 210 into the first through-hole 211 and then to the second through-hole 212 along the first spiral oil groove 213, the lubricating oil flows into the separating cavity 22 through the second through-hole 212 and can only flow to the eccentric cavity 110 due to the blocking of the oil slinger 44, and finally flow out from the oil outlet hole 111. However, when the crankshaft assembly 100 is rotated along the second direction, the lubricating oil will flow from the first cavity 210 into the second spiral oil groove 41, and flow along the second spiral oil groove 41 to the third through-hole 43, the lubricating oil can only flow into the countersink 42 from the third through-hole 43 due to the blocking of the oil slinger 44, and flow from the notch of the countersink 42 into the eccentric cavity 110, and finally flow out from the oil outlet hole 111.

Figure 4:
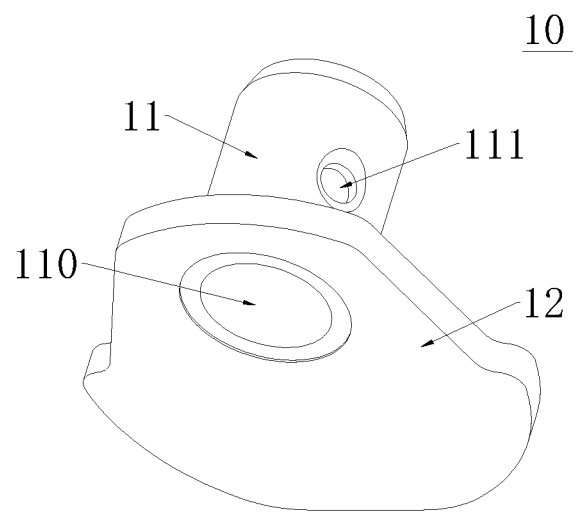
FIG. 4 is a schematic view of an eccentric shaft component of a crankshaft assembly according to the present disclosure.
Figure 5:
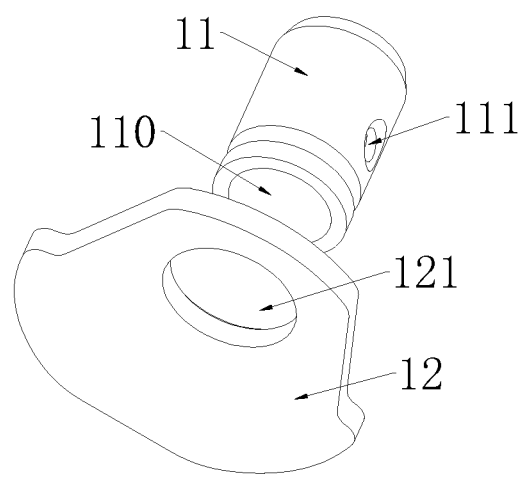
FIG. 5 is an exploded view of the eccentric shaft component illustrated in FIG. 4.
Figure 6:
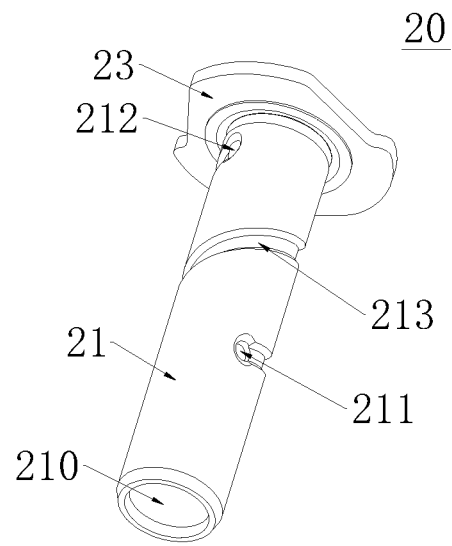
FIG. 6 is a schematic view of a spindle component of a crankshaft assembly according to the present disclosure.
Figure 7:
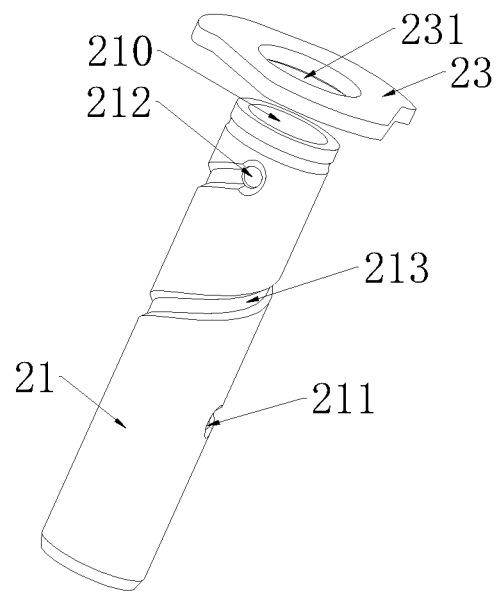
FIG. 7 is an exploded view of the spindle component illustrated in FIG. 6.

As illustrated in FIGS. 1, 4 and 5, a first crank arm 23 is fixedly provided at the an end of the first spindle 21 adjacent to the eccentric shaft component 10 (for example, the upper end in FIG. 1), a spindle hole 231 is defined in the first crank arm 23, the spindle hole 231 can pass through the first crank arm 23, and the first spindle 21 extend into the spindle hole 231 to be mounted in the spindle hole 231. The crankshaft assembly 100 also includes an oil guide plate 30, and the oil guide plate 30 is fixed mounted between the eccentric shaft component 10 and the first crank arm 23. For example, the oil guide plate 30 can be welded between the eccentric shaft component 10 and the first crank arm 23. The oil guide plate 30 is provided with an oil guide hole 31, the oil guide hole 31 can pass through the oil guide plate 30 along the axial direction of the crankshaft assembly 100, and the first cavity 210 is communicated with the eccentric cavity 110 through the oil guide hole 31. For example, the first cavity 210 can pass through an end of the first spindle 21 adjacent to the oil guide plate 30 to be communicated with the oil guide hole 31, so the oil from the first cavity 210 can flow to the eccentric cavity 110 through the oil guide hole 31.

In some embodiments of the present disclosure, as illustrated in FIGS. 1 and 2, an axial end of the second spindle 401 (for example, the upper end in FIG. 1) extends into the oil guide hole 31, and the axial end of the second spindle 401 has a position-limiting part 451. The position-limiting part 451 can extend from an outer edge of the second spindle 401 in a direction away from the eccentric shaft component 10, and the position-limiting part 451 abuts against the end face of the first spindle 21 or the end face of the first crank arm 23, thereby facilitating achievement of the position-limiting of the second spindle 401 and ensuring the mounting stability of the main screw oil pump 40.

For example, as illustrated in FIG. 9, the position-limiting part 451 is formed as a positioning boss 45, and the positioning boss 45 abuts against the end face of the first spindle 21, such that under the premise of ensuring the stable installation of the second spindle 401, a larger hole area is avoided for the oil guide hole 31, alignment of a portion of the outer edge of the oil guide hole 31 with a portion of the outer edge of the spindle hole 231 is facilitated, and the processing efficiency of the oil guide plate 30 is improved.

In some embodiments of the present disclosure, as illustrated in FIGS. 3, 4, 5 and 8, the eccentric shaft component 10 includes an eccentric shaft 11 and a second crank arm 12. The eccentric cavity 110 is defined in the eccentric shaft 11. An eccentric shaft hole 121 is defined in the second crank arm 12, the eccentric shaft hole 121 can pass through the second crank arm 12, and the eccentric shaft 11 can extend into the eccentric shaft hole 122 to be mounted in the eccentric shaft hole 121. The oil guide hole 31 includes a first hole 311 and a second hole 312 communicated with each other. The first hole 311 and the second hole 312 are disposed along a radial direction of the oil guide plate 30, that is, a center axis of the first hole 311 and a center axis of the second hole 312 can be disposed in parallel and spaced apart from each other. The first hole 311 and the spindle hole 231 are coaxially disposed and the second hole 312 and the eccentric shaft hole 121 are coaxially disposed, which readily ensures that the first cavity 210 is communicated with the eccentric cavity 110 through the oil guide hole 31.

For example, as illustrated in FIGS. 4 to 7, in order to make the eccentric shaft 11 be disposed eccentrically with the first spindle 21 more easily, the eccentric shaft component 10 includes a second crank arm 12, and the second crank arm 12 is provided with an eccentric shaft hole 121 corresponding to an opening of the eccentric shaft 11. An end of the first spindle 21 is an opening, the spindle component 20 includes the first crank arm 23, and the first crank arm 23 is provided with the spindle hole 231 corresponding to the opening of the first spindle 21. It should be understood that the eccentric shaft 11 can be disposed on the second crank arm 12 in various ways, for example, a fixed arrangement by means of laser welding. In order to achieve the effect of eccentric arrangement, the eccentric shaft hole 121 and the maximum outer circle of the outer contour of the second crank arm 12 are disposed eccentrically, such that the eccentric shaft 11 communicated with the eccentric shaft hole 121 and the maximum outer circle of the outer contour of the second crank arm 12 are also disposed eccentrically. Furthermore, the first spindle 21 can be provided on the first crank arm 23 in various ways, for example, a fixed arrangement by means of laser welding. The spindle hole 231 and the maximum outer circle of the outer contour of the first crank arm 23 are disposed coaxially, such that the first spindle 21 connected to the spindle hole 231 and the maximum outer circle of the outer contour of the first crank arm 23 are also disposed coaxially.

Figure 8:
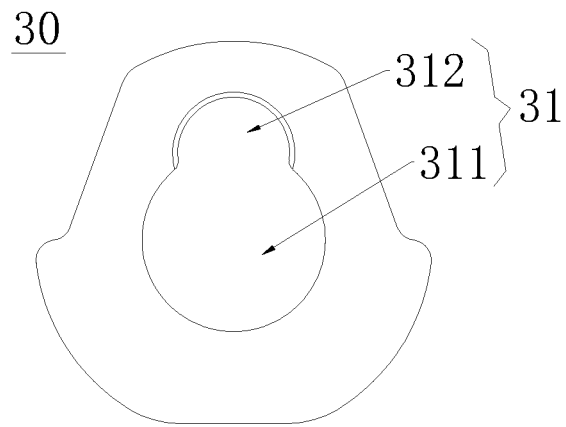
FIG. 8 is a schematic view of an oil guide plate of a crankshaft assembly according to the present disclosure.

It should be understood that the shape of the cross section of the oil guide plate 30 may be set as various shapes, which will not affect the operation of the oil guide hole 31. In some embodiments of the present disclosure, the outer contour of the cross section of the oil guide plate 30, the outer contour of the cross section of the second crank arm 12 and the outer contour of the cross section of the first crank arm 23 have a consistent or corresponding shape. Furthermore, in order to make the lubricating oil pass through the oil guide hole 31 more smoothly, as illustrated in FIG. 8, the oil guide hole 31 is constituted by an outer contour of two intersected round holes located in the same plane and having different centers. Two sides of the oil guide hole 31 are connect with the second crank arm 12 and the first crank arm 23 respectively, and the two round holes are disposed coaxially with the eccentric shaft hole 121 and the spindle hole 231 respectively. That is, projection of the oil guide hole 31 along the axial direction of the oil guide plate 30 coincides with the contour of the eccentric shaft hole 121 and the spindle hole 231.

In order to fit and install the main screw oil pump 40 with the first spindle 21 easily and accurately, as illustrated in FIG. 9, an end of the main screw oil pump 40 is provided with the positioning boss 45, and the positioning boss 45 contacts with the opening of the first spindle 21 to complete positioning of the main screw oil pump 40 relative to the first spindle 21.

Figure 10:
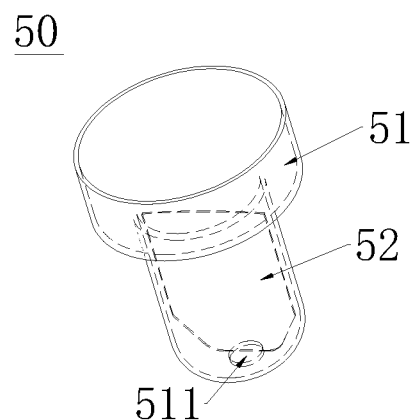
FIG. 10 is a schematic view of an oil pump component of a crankshaft assembly according to the present disclosure.

In some embodiments of the present disclosure, in order to supply the lubricating oil to the first cavity 210, as illustrated in FIGS. 1, 3 and 10, the crankshaft assembly 100 includes an oil pump component 50, and the oil pump component 50 is provided at an end of the first spindle 21 away from the eccentric shaft component 10 to supply the oil to the first cavity 210.

In order to better extract the lubricating oil and let it flow into the first cavity 210, as illustrated in FIGS. 1 and 10, the oil pump component 50 includes an oil pump housing 51 and an oil vane 52 disposed inside the oil pump housing 51. A first end of the oil pump housing 51 is provided with an oil inlet 511, and a second end of the oil pump housing 51 is connected with the first spindle 21. When the crankshaft assembly 100 is rotated, the lubricating oil flows from the oil inlet 511 to the oil pump housing 51, and flows into the first cavity under the rotation drive of the oil vane 52.

It is should be understood that the oil vane 52 and the oil pump housing 51 can be connected in a variety of connection ways, which will not affect effectiveness of the oil pumping. In some embodiments of the present disclosure, for easy of mounting and demounting, the oil vane 52 and the oil pump housing 51 are disposed to be in interference fit with each other. Likewise, the oil pump housing 51 and the first spindle 21 can also be connected with interference fit.

In an example in FIG. 1, an axis of the eccentric shaft 11 is disposed parallel to an axis of the first spindle 21, the oil outlet hole 111 of the eccentric shaft 11 is communicated with the second through-hole 212 of the first spindle 21 through the oil guide hole 31 of the oil guide plate 30, and the main screw oil pump 40 is provided in the first cavity 210 and an end of the second spiral oil groove 41 is communicated with the oil guide hole 31.

Therefore, the working principle of the crankshaft assembly 100 of the present disclosure is as follows: the oil outlet hole 111 of the eccentric shaft 11 is communicated with the first cavity 210 through the oil guide hole 31 of the oil guide plate 30, while the main screw oil pump 40 and the first spindle 21 are coaxially provided in the first cavity 210, such that when the crankshaft assembly 100 is rotated along the first direction, the lubricating oil entering the first cavity 210 will sequentially pass through the first through-hole 211, the first spiral oil groove 213, the second through-hole 212 and the oil guide hole 31, and finally be discharged from the oil outlet hole 111; when the crankshaft assembly 100 is rotated along the second direction opposite the first direction, the oil entering the cavity of the first spindle 21 sequentially pass through the second spiral oil groove 41 and the oil guide hole 31, and finally be discharged from the oil outlet hole 111. It should be understood that the spiral directions of the first spiral oil groove 213 and the second spiral oil groove 41 are opposite, so the lubricating oil can move toward the oil outlet hole 111 of the eccentric shaft 11 through one of the spiral oil grooves whether the crankshaft assembly 100 is rotated along the first direction or the second direction (i.e. the compressor turns forward or reverse), ensuring that the lubricating oil can sufficiently lubricate individual components of the entire crank and link assembly (the crankshaft assembly 100 is also a component of the crank and link assembly) when the crankshaft assembly 100 is rotated.

Figure 11:
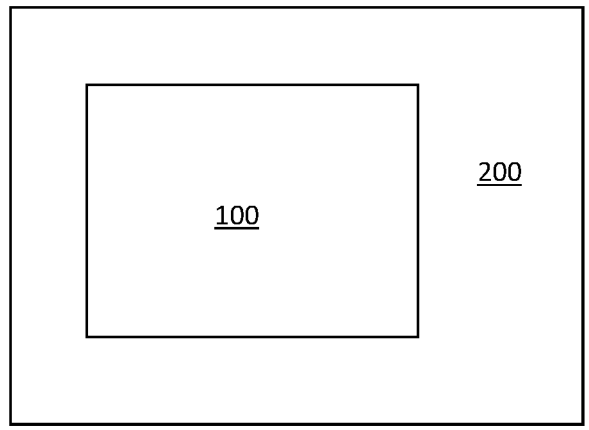
FIG. 11 is a schematic block diagram showing a compressor according to another embodiment of the present disclosure.

A second aspect of the present disclosure provides a compressor 200 as shown in FIG. 11, and the compressor includes the above crankshaft assembly 100. Whether the compressor turns forwards or reversely, the crankshaft assembly 100 will supply the lubricating oil to the individual components of the crank and link assembly of the compressor, and the sufficient amount of pumped oil can be ensured, thereby making the compressor running smoothly.

Figure 12:
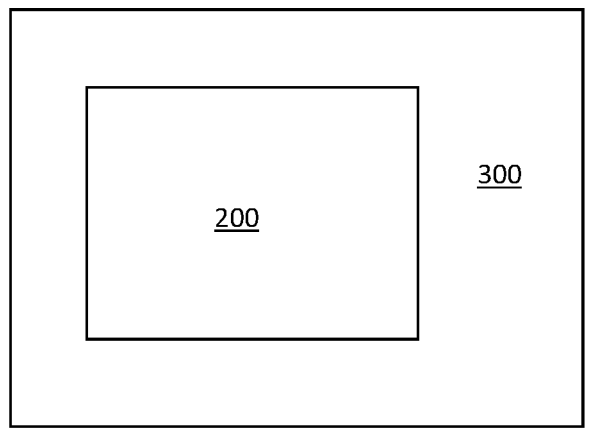
FIG. 12 is a schematic block diagram showing a refrigeration device according to yet another embodiment of the present disclosure view of an oil pump component of a crankshaft assembly according to the present disclosure.

The present disclosure further provides a refrigeration device 300 as shown in FIG. 12, and the refrigeration device includes the above compressor 200.

Some embodiments of the present disclosure are described above in detail with reference to the accompanying drawings, but the present disclosure is not limited to this. Various simple variations can be made to the technical scheme of the present disclosure within the scope of the technical idea of the present disclosure, these possible different combinations is no longer described additionally in the present disclosure to avoid unnecessary repetition. However, these simple variations and combinations should also be deemed as the content of the present disclosure and fall within the scope of the present disclosure.

What is claimed is:

1. A crankshaft assembly comprising:
   an eccentric shaft component having an eccentric cavity, an oil outlet hole being defined through a wall defining the eccentric cavity;
   a spindle component provided at an axial end of the eccentric shaft component and comprising a first spindle having a first cavity communicated with the eccentric cavity, the first spindle being provided with a first through-hole and a second through-hole spaced apart in the length direction of the first spindle, the first through-hole and the second through-hole being each communicated with the first cavity, an outer surface of the first spindle being provided with a first spiral oil groove connecting the first through-hole and the second through-hole; and a main screw oil pump comprising a second spindle provided in the first cavity, an outer surface of the second spindle being provided with a second spiral oil groove in the length direction of the second spindle, a spiral direction of the second spiral oil groove being opposite a spiral direction of the first spiral oil groove, a first end of the second spiral oil groove being communicated with the first cavity and a second end of the second spiral oil groove being communicated with the eccentric cavity;

wherein:

when the crankshaft assembly is rotated along a first direction, the first cavity and the oil outlet hole are in fluid communication through the first spiral oil groove, such that oil entering the first cavity is permitted to flow to the oil outlet hole through the first spiral oil groove; and when the crankshaft assembly is rotated along a second direction opposite to the first direction, the first cavity and the oil outlet hole are in fluid communication through the second spiral oil groove, such that the oil entering the first cavity is permitted to flow to the oil outlet hole through the second spiral oil groove.

2. The crankshaft assembly according to claim 1, wherein:

an end of the second spindle is provided with a countersink, a notch of the countersink is communicated with the eccentric cavity, the second spindle is provided with a third through-hole communicated with the countersink, and the second end of the second spiral oil groove is communicated with the third through-hole.

3. The crankshaft assembly according to claim 2, wherein:

the second spindle and the first cavity are in clearance fit with each other;

an oil slinger is provided between the third through-hole and the notch of the countersink, and the oil slinger abuts against the outer surface of the second spindle and an inner wall of the first cavity respectively; and a separating cavity is defined between the oil slinger, the outer surface of the second spindle and the inner wall of the first cavity, the separating cavity is communicated with the eccentric cavity, and the second through-hole is provided adjacent to the eccentric shaft component and is communicated with the separating cavity.

4. The crankshaft assembly according to claim 1, wherein an end of the first spindle adjacent to the eccentric shaft component is provided in a fixed manner with a first crank arm defining a spindle hole, and the first spindle is mounted in the spindle hole; and the crankshaft assembly further comprises an oil guide plate provided in a fixed manner between the eccentric shaft component and the first crankshaft arm, the oil guide plate being provided with an oil guide hole, and the first cavity being communicated with the eccentric cavity through the oil guide hole.

5. The crankshaft assembly according to claim 4, wherein an axial end of the second spindle extends into the oil guide hole and has a position-limiting part abutting against an end face of the first spindle or an end face of the first crank arm.

6. The crankshaft assembly according to claim 5, wherein the position-limiting part comprises a positioning boss, and the positioning boss abuts against the end face of the first spindle.

7. The crankshaft assembly according to claim 4, wherein:

the eccentric shaft component comprises an eccentric shaft defining the eccentric cavity and a second crank arm defining an eccentric shaft hole, and the eccentric shaft is mounted in the eccentric shaft hole; and the oil guide hole comprises a first hole and a second hole communicated with each other, the first hole and the second hole are disposed along a radial direction of the oil guide plate, the first hole and the spindle hole are coaxially disposed, and the second hole and the eccentric shaft hole are coaxially disposed.

8. The crankshaft assembly according to claim 1, further comprising an oil pump component, wherein the oil pump component is provided at an end of the first spindle distal from the eccentric shaft component to supply oil to the first cavity, the oil pump component comprises an oil pump housing and an oil vane disposed inside the oil pump housing, a first end of the oil pump housing is provided with an oil inlet and a second end of the oil pump housing is connected with the first spindle.

9. The crankshaft assembly according to claim 8, wherein:

the oil vane and the oil pump housing are in interference fit with each other.

10. The crankshaft assembly according to claim 9, wherein:

the oil pump housing and the first spindle are in interference fit with each other.

11. The crankshaft assembly according to claim 8, wherein:

the oil pump housing and the first spindle are in interference fit with each other.

12. A compressor comprising the crankshaft assembly according to claim 1.

13. A refrigeration device comprising the compressor according to claim 12.

* * * * *